United States Patent
Wagner

(10) Patent No.: US 10,975,962 B2
(45) Date of Patent: Apr. 13, 2021

(54) METHOD AND ARRANGEMENT FOR CONTROLLING DRIVING STATES OF A UTILITY VEHICLE

(71) Applicant: DEERE & COMPANY, Moline, IL (US)

(72) Inventor: Christoph Wagner, Reilingen (DE)

(73) Assignee: DEERE & COMPANY, Moline, IL (US)

( * ) Notice: Subject to any disclaimer, the term of this patent is extended or adjusted under 35 U.S.C. 154(b) by 719 days.

(21) Appl. No.: 15/448,847

(22) Filed: Mar. 3, 2017

(65) Prior Publication Data

US 2017/0261100 A1    Sep. 14, 2017

(30) Foreign Application Priority Data

Mar. 8, 2016    (DE) .......................... 102016203763.3

(51) Int. Cl.
*F16H 61/00* (2006.01)
*F16H 61/22* (2006.01)
(Continued)

(52) U.S. Cl.
CPC ............. *F16H 61/22* (2013.01); *B60K 20/02* (2013.01); *F16H 59/0278* (2013.01);
(Continued)

(58) Field of Classification Search
CPC ...... F16H 61/22; F16H 59/0278; F16H 59/08; F16H 59/10; F16H 59/06;
(Continued)

(56) References Cited

U.S. PATENT DOCUMENTS 2,916,928 A * 12/1959 Maurer ................. B60W 30/18
74/336 R
2002/0152828 A1 * 10/2002 Nagasaka .............. B60K 37/06
74/473.3
(Continued)

FOREIGN PATENT DOCUMENTS

DE    19502482 A1    8/1996
DE    19637533 A1    3/1998
(Continued)

OTHER PUBLICATIONS

German Search Report in foreign counterpart application No. 17158436.0 dated Aug. 10, 2017 (6 pages).
(Continued)

*Primary Examiner* — Zakaria Elahmadi

(57) ABSTRACT

A method is provided for alternately triggering driving states of a utility vehicle. The method includes providing a control element and a transmission selectively engageable in a forward driving state (F) for forward travel of the utility vehicle, a reverse driving state (R) for reverse travel, and a standstill driving state (S) for a stationary output of the transmission without disconnection of the drivetrain in the utility vehicle. The method further includes operating the transmission in a current driving state, operably selecting a target driving state while operating in the current driving state, and controllably triggering the transmission to the standstill driving state before shifting the transmission to the target driving state.

12 Claims, 2 Drawing Sheets

(51) Int. Cl.
*F16H 59/08* (2006.01)
*B60K 20/02* (2006.01)
*F16H 59/02* (2006.01)
*F16H 59/10* (2006.01)
*F16H 59/06* (2006.01)

(52) U.S. Cl.
CPC ............ *F16H 59/08* (2013.01); *F16H 59/10* (2013.01); *F16H 59/06* (2013.01); *F16H 2059/0239* (2013.01); *F16H 2059/0256* (2013.01); *F16H 2059/0282* (2013.01); *F16H 2059/0295* (2013.01); *F16H 2059/081* (2013.01)

(58) Field of Classification Search
CPC ..... F16H 2059/0239; F16H 2059/0256; F16H 2059/0282; F16H 2059/0295; F16H 2059/081; B60K 20/22
See application file for complete search history.

(56) References Cited

U.S. PATENT DOCUMENTS

| | | | | |
|---|---|---|---|---|
| 2006/0201768 | A1* | 9/2006 | Hori | F02N 11/103 192/84.1 |
| 2007/0034745 | A1* | 2/2007 | Fackler | F16H 61/12 244/158.2 |
| 2008/0040009 | A1* | 2/2008 | Kamada | B60K 37/06 701/51 |
| 2009/0088935 | A1* | 4/2009 | Kitaori | F16H 59/0204 701/52 |
| 2009/0288903 | A1* | 11/2009 | Musmaker | E02F 9/202 180/336 |
| 2012/0305360 | A1* | 12/2012 | Kitaori | F16H 63/3466 192/219.4 |
| 2013/0152718 | A1* | 6/2013 | Matsuo | F16H 61/16 74/336 R |
| 2013/0184948 | A1* | 7/2013 | Anderson | F16H 59/06 701/55 |
| 2014/0157931 | A1* | 6/2014 | Hayashi | F16H 61/12 74/473.3 |
| 2015/0020634 | A1* | 1/2015 | TenBrink | F16H 63/42 74/473.33 |
| 2015/0114158 | A1* | 4/2015 | Tenbrink | F16H 59/0278 74/473.25 |
| 2017/0248228 | A1* | 8/2017 | Tomita | F16H 59/10 |

FOREIGN PATENT DOCUMENTS

| | | |
|---|---|---|
| DE | 10140975 A1 | 3/2003 |
| DE | 10217614 A1 | 11/2003 |
| DE | 102011087330 A1 | 5/2013 |
| WO | 2013106504 A1 | 7/2013 |

OTHER PUBLICATIONS

German Search Report in foreign counterpart application No. 102016203763.3 dated Nov. 8, 2016 (8 pages).

* cited by examiner

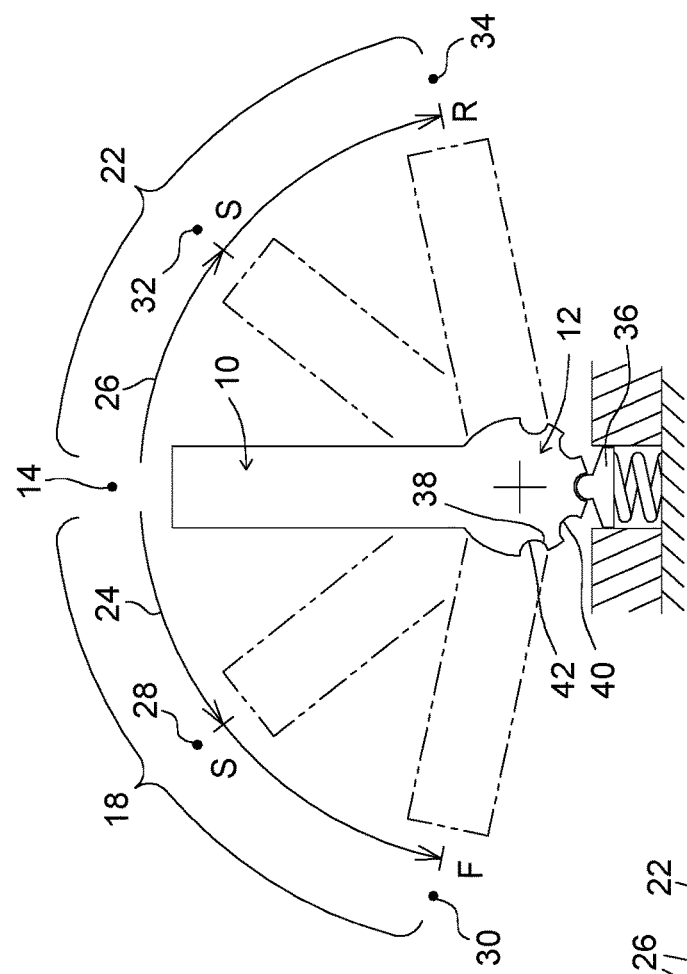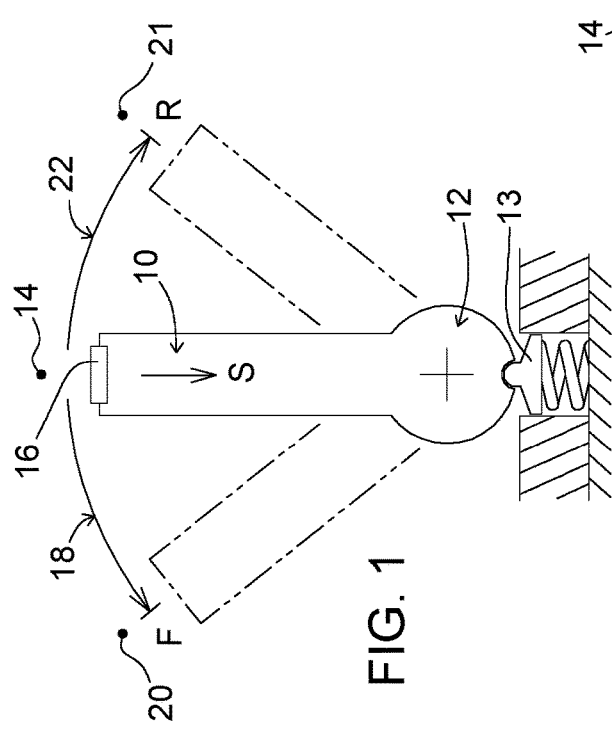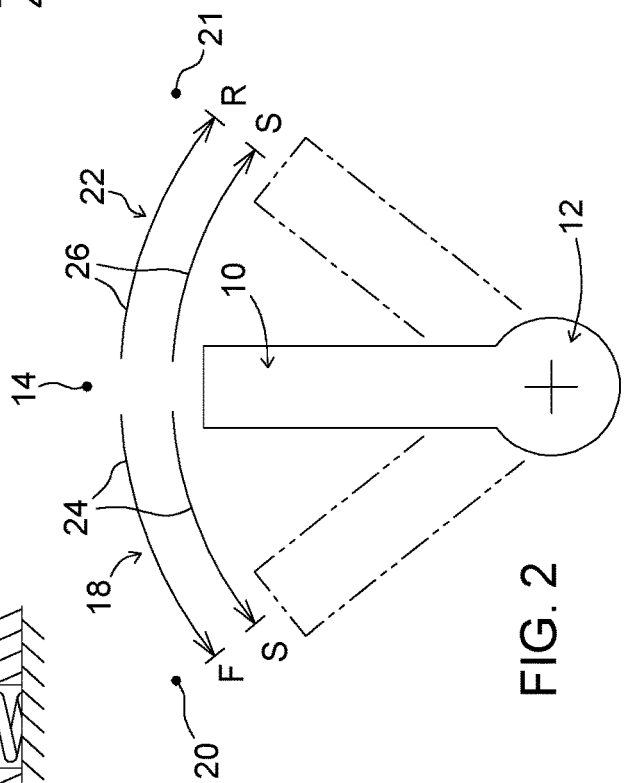

METHOD AND ARRANGEMENT FOR CONTROLLING DRIVING STATES OF A UTILITY VEHICLE

RELATED APPLICATIONS

This application claims the benefit of German Application Ser. No. 102016203763.3, filed on Mar. 8, 2016, the disclosure of which is hereby expressly incorporated by reference in its entirety.

FIELD OF THE DISCLOSURE

The present disclosure relates to a method and an arrangement for controlling driving states of a utility vehicle.

BACKGROUND

Utility vehicles are used, among other things, for performing certain work functions. These include, for example, loading or transport work for the performance of which the utility vehicle has suitable implements. For an agricultural utility vehicle, these implements include a loading shovel, a manure fork or other implements. Appropriate actuating elements and instruments for actuating these implements are usually provided in the driver's cab of the utility vehicle. In addition, the driver must often change the driving direction between "forward" and "reverse" while performing such work functions. For this purpose, at least one corresponding actuating element is provided for the driver.

SUMMARY

In one embodiment of the present disclosure, a method is provided for alternate triggering of driving states "forward" and "reverse" by means of a control element. "forward" in this case means forward travel driven by a transmission of the utility vehicle, and "reverse" means reverse travel driven by the transmission of the utility vehicle. A target driving state ("reverse" or "forward") an be activated from a current driving state ("forward" or "reverse") by means of the control element.

A "standstill" driving state is also provided which corresponds to a stationary output of the vehicle transmission without disconnecting the drivetrain with a clutch. This driving state is also referred to as active standstill and is possible particularly for tractors with a continuously variable transmission. Such continuously variable transmissions also allow startup from standstill without a startup clutch. For transmissions that do not have active standstill, the neutral position of the transmission or the disengagement of the drive clutch constitutes the driving state "standstill."

Irrespective of this, the "standstill" driving state is often desired or necessary for an intended change of drive direction ("forward" to "reverse" or "reverse" to "forward") as a temporary operating state or intermediate state in order to be able to support the utility vehicle in terms of traction or safety. The "standstill" driving state terminates the drive movement of the drive axle(s) of the utility vehicle during a current driving state "forward" or "reverse."

At least one additional driving state can be provided.

Controlling the utility vehicle, in particular a tractor or some other agricultural vehicle, during operation thereof (e.g. loading work) is now simplified in a user-friendly manner by triggering the control element in case of an intended change of the current driving state in such a manner that the "standstill" driving state is automatically initially activated before activating the target driving state.

The term "triggering" a driving state (e.g. target driving state or "standstill") is to be understood to mean that this driving state is achieved or activated by actuating the control element.

This means that in an intended change from a current driving state "forward" to a target driving state "reverse," or from a current driving state "reverse" to a target driving state "forward," the "standstill" driving state is triggered first. Only after that can the actually intended driving state be achieved or activated. In this way, an intuitive and simple control of the utility vehicle by the vehicle driver or user is enabled, by avoiding conventionally required additional and cumbersome control processes with different control routes or additional operating elements to achieve the "standstill" driving state when changing direction from "forward" to "reverse" and vice versa. Advantageously, the control function for the "standstill" driving state and also the control movement necessary for this can be integrated into a control element provided for changing the actual travel direction and into the control movements thereof. Consequently the user can easily control an intended change of travel direction and can trigger the "standstill" driving state because the triggering of the "standstill" driving state is integrated into the control process for the change of travel direction.

Since the "standstill" driving state is automatically triggered during an intended triggering of a target driving state, it is guaranteed that the "standstill" driving state is first activated before a change of travel direction, without an additional control effort by the user or the vehicle driver.

This triggering principle contributes to being able to reduce the number of different operating functions or operating elements for controlling the utility vehicle. Therefore the corresponding arrangement with the control element and optionally additional operating elements can be provided in a correspondingly more space-saving and less complex manner.

The target driving state is triggered by the control element by means of a change-control movement, wherein the "standstill" driving state is automatically achieved before or during such a change-control movement. Thereby the triggering of the temporary driving state "standstill" is integrated in a user-friendly and intuitive manner into the process of the change-control movement.

In an advantageous embodiment, the control element is releasably locked during a current driving state, and this locking must be released before performing the change-control movement. This reliably avoids unintentional erroneous operation of the control element. The release of this locking can preferably activate the temporary driving state "standstill" in an additional function. The "standstill" driving state is thus automatically triggered without additional operating effort before an intended change-control movement.

For example, a pushbutton can be actuated on the control element to release the locking. Actuating this pushbutton can then simultaneously effect an activation of the "standstill" driving state. This multiple function of the pushbutton supports a simply designed structure of the control element.

Alternatively, a defined segment or component of the change-control movement of the control element can be considered a basic control movement in such a manner that the "standstill" driving state is triggered or activated by performing the basic control movement. In this way, different movement processes of the control element for triggering the target driving state on the one hand and the "standstill" driving state on the other can be avoided in a simple manner.

A user-friendly triggering by means of the control element is further supported in that the change in control movement of the control element for activating a target driving state includes a repeated performance of the basic control movement, and in particular consists only of a repeated performance of the basic control movement. For example, the "standstill" driving state is triggered by a first performance of the basic control movement, while a subsequent performance of the same basic control movement triggers the target driving state. Thereby the control movements for triggering the different driving states are particularly simple and user-friendly.

An additional embodiment supports a reliable actuation of the control element by providing at least one catch position for detachable engagement of the control element during performance of the change-control movement or basic control movement. By means of the catch position(s), an unambiguous position of the control element is always achieved during the various triggering processes in a technically simple manner.

In particular, the transfer of the control element into a catch position can correspond to the triggering of a driving state (in particular, "forward," "reverse," or "standstill"), whereby the triggering of the various driving states can be even more intuitive for the user.

It is also provided that the control element is in a defined rest position during a current driving state. In this way, the current status of the control element can be unambiguously recognized by the user in a simple manner.

In particular, the control element is automatically brought back into its rest position (by means of a suitable mechanism) after triggering the "standstill" driving state or a target driving state, which simplifies the handling of the control element for the user or the vehicle driver.

The individual control movements of the control element can be performed particularly simply and intuitively by forming the control element preferably as a pivoting control lever.

Alternatively, the control element can be designed as a rotatable or turnable roller, whereby the control element can be arranged in a particularly space-saving manner and can be comfortably operated by the user with one finger.

An arrangement in the driver's cab can include the control element for changing the driving direction. This arrangement can contain additional operating elements for controlling or performing various functions of the utility vehicle (e.g. a tractor or some other agricultural vehicle). An actuating instrument for controlling a work function (e.g. transporting material by means of a loading shovel) of the utility vehicle can also be provided as a component of the arrangement. In order to make the necessary driving direction change during such work functions more comfortable for the user or vehicle driver, the control element is arranged on the above-mentioned actuating instrument. In this way, the user can control both work functions and a desired change of driving direction with the same hand on a single actuating instrument.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 is a schematic side view of handling a control element in a first embodiment, FIG. 2 is a schematic side view of handling a control element in a second embodiment, FIG. 3 is a schematic side view of handling a control element in a third embodiment.

DETAILED DESCRIPTION

Figure 4:
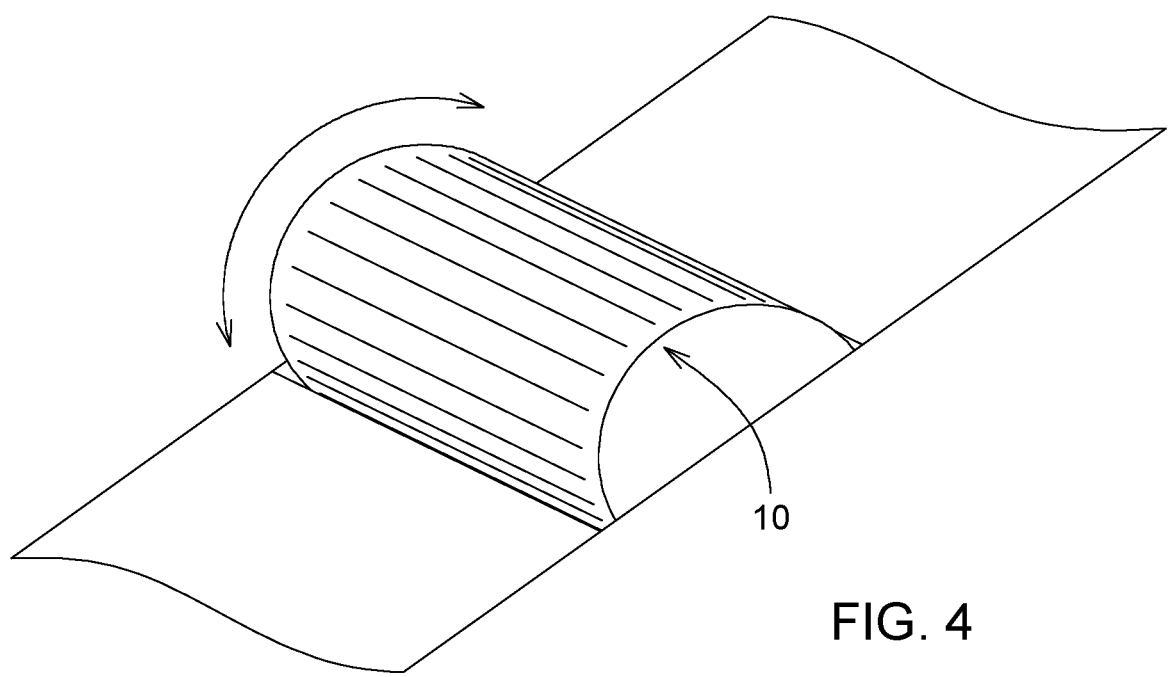
FIG. 4 is a perspective view of an additional embodiment of the control element.

In a first embodiment, the method and the arrangement with a control element 10 for controlling a drive direction change of a utility vehicle will be described in detail with reference to FIGS. 1-5. At least the following driving states may be possible for the utility vehicle:

"Forward" (with reference sign "F") for forward travel driven by the transmission of the utility vehicle;

"Reverse" (with reference sign "R") for reverse travel driven by the transmission of the utility vehicle; and "Standstill" (with reference sign "S") for stationary output of the transmission without disconnection of the drivetrain in the utility vehicle. For transmissions that do not have an active standstill, the neutral position of the transmission or the disengagement of the drive clutch can take the place of such an active standstill.

FIG. 1 shows a first embodiment for the handling and mode of operation of a lever-like control element 10, which is mounted pivotably about a schematically shown pivot bearing 12. The pivot bearing 12 is coupled, in a manner not shown here, to a control mechanism that activates a desired new driving state (target driving state) depending on the pivot position of the control element 10. During a current driving state F, R, or S, the control element 10 is in a center resting position 14. In this resting position 14, the control element 10 is releasably locked, for example, by means of a locking pin 13 that engages with the pivot bearing 12 under a preload from a spring force and that can be pressed out of the pivot bearing 12 by actuating the pushbutton 16.

If the utility vehicle is currently driving in reverse R and a change of driving direction to F is to be performed, the user first releases the locking of the control element 10. A pushbutton 16 is pressed in the direction of the pivot bearing 12 for this purpose. This actuation of the pushbutton 16 automatically activates the driving state S. In this manner, the reverse driving of the utility vehicle is first terminated in a defined and automatic manner before the actual change of driving direction. Only after the locking is released, i.e., only after activation of the driving state S, can the control element 10 carry out a change-control movement 18 by being pivoted in the direction of a target position 20. For a current driving state R, this target position 20 corresponds to the target driving state F.

In principle, the same actuation of the control element 10 is provided if the vehicle is to change to the target driving state R while in a current driving state F. The control element 10 carries out a change-control movement 22 in the opposite direction of the change-control movement 18, in the direction of a target position 21 which corresponds to the target driving state R. After triggering the target driving state F or R, the control element 10 is automatically returned to its rest position 14 by means of a suitable mechanism.

The control element 10 according to FIG. 2 is again in the resting position during a current driving state F, R, or S. The control element 10 can be protected against unintended movements out of the rest position by a spring force or releasable locking or the like. The control element 10 is again pivoted in order to carry out a change-control movement 18 or 22 for a driving direction change. Here, however, the change-control movement 18 or 22 is composed of two successively performed basic control movements 24 or 26. The basic control movement 24 or 26 is thus repeated once in order to trigger the target driving state. After carrying out the basic control movement 24 or 26 or the change-control movement 18 or 22, i.e., after activation of the driving state S or the driving state F or R—the control element 10 is automatically returned by means of a suitable mechanism to its resting position 14. In this control scheme, the user must also necessarily or automatically first activate the driving state S before the desired target driving state F or R is triggered.

The control element 10 according to FIG. 3 differs from the variant according to FIG. 2 particularly by a different design of the change-control movement 18 or 22. The basic control movement 24 or 26 for triggering the temporary driving state S in this case forms a first portion of the overall change-control movement 18 or 22. After the entire change-control movement 18 or 22 has been performed, the desired target driving state F or R is activated. A user-friendly handling of the control element 10 is supported in that, starting from the resting position 14, the states S, F, and R to be triggered each correspond to a specific catch position 28, 30, 32, or 34. In these catch positions 28, 30, 32, 34, the control element 10 is releasably engaged so that the triggered driving state is unambiguously signaled to the user. This releasable engagement is achieved, for example, by a catch element 36 that, under a preload from a spring force, presses against a control track 38 of the pivot bearing 12 or engages with individual recesses 40, 42 of this control track 38.

In the variant according to FIG. 3, the control element 10 is automatically returned by a suitable mechanism to its resting position 14 at least after performing the change-control movement 18 or 22, i.e., after activating the target driving state F or R.

As illustrated on the basis of FIGS. 1-3, the control element 10 can be constructed as a pivoting control lever. Alternatively, the control element 10 can be constructed according to FIG. 4 as a turnable or rotatable control roller, which is suitable for operation by means of a finger or thumb of the user. In principle, the same control schemes or control movements as those shown with FIGS. 1-3 can be implemented with this control unit.

Figure 5:
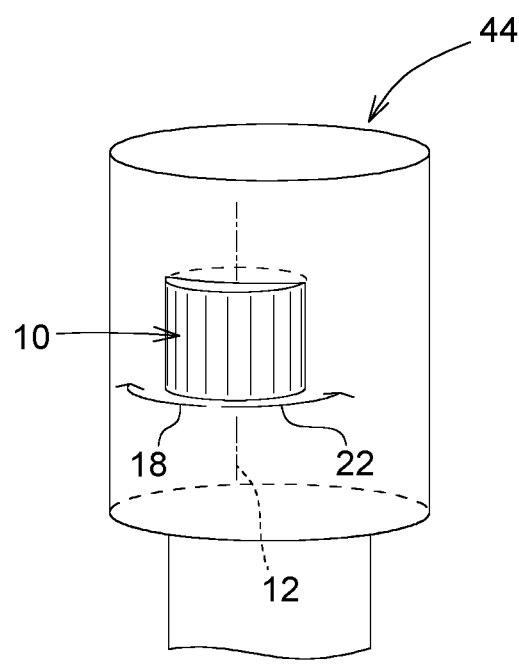
FIG. 5 is a perspective representation of an actuating instrument having an integrated control element.

FIG. 5 shows an actuating instrument 44 (e.g. a joystick) that is equipped with corresponding control functions for controlling various work functions of a utility vehicle, e.g., a tractor or some other agricultural vehicle. The control element 10 is integrated into this actuating instrument by being arranged on a side surface of the actuating instrument 44. Varying from this, an arrangement on a top, front, rear or lower surface of the actuating instrument 44 can also be provided. The user or driver of the utility vehicle can therefore control both work functions and desired driving direction changes in a user-friendly manner with one hand and a single actuating instrument.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for alternately triggering driving states of a utility vehicle, comprising:
    providing a control element and a transmission selectively engageable in a forward driving state (F) for forward travel of the utility vehicle, a reverse driving state (R) for reverse travel, and a standstill driving state (S) for a stationary output of the transmission without disconnection of the drivetrain in the utility vehicle;
    operating the transmission in a current driving state with the control element in a resting position and a locking element locked;
    automatically triggering the transmission to the standstill driving state by releasing the locking element while the control element remains in the resting position;
    operably selecting a target driving state while operating in the standstill driving state by positioning the control element in a first target position from the resting position;
    automatically returning the control element to the resting position from the first target position after triggering the transmission to the target driving state; and
    operating the transmission in the target driving state until the locking element is released triggering the transmission to the standstill driving state.

2. A system for alternately triggering a utility vehicle between a plurality of driving states, comprising:
    a transmission selectively operable in at least a forward driving state for forward travel of the utility vehicle, a reverse driving state for reverse travel, and a standstill driving state (S) for a stationary output of the transmission without disconnection of the drivetrain in the utility vehicle;
    a control element configured to alternately trigger the transmission between driving states; and
    a locking element configured to releasably lock the control element in a resting position;
    wherein the transmission is operating in a current driving state with the control element in the resting position and the locking element locked;
    wherein the transmission is automatically triggered to the standstill driving state by releasing the locking element while the control element remains in the resting position;
    wherein the control element is operably triggered to a target driving state from the standstill driving state by positioning the control element in a first target position from the resting position;
    wherein the control element is automatically returned to the resting position from the first target position after triggering the target driving state; and
    wherein the transmission remains in the target driving state until the locking element is released triggering the transmission to the standstill driving state.

3. The system of claim 2, wherein the control element comprises a pivoting control lever.

4. The system of claim 2, wherein the control element comprises a rotatable control roller.

5. The system of claim 2, wherein the control element is arranged on an actuating instrument for operably controlling at least one work function by means of the utility vehicle.

6. The method of claim 1, wherein the current driving state is the forward driving state and the target driving state is the reverse driving state.

7. The system of claim 2, wherein the current driving state is the forward driving state and the target driving state is the reverse driving state.

8. The method of claim 1, wherein the control element comprises a pivoting control lever.

9. The method of claim 1, wherein the control element comprises a rotatable control roller.

10. The method of claim 1, wherein the control element is arranged on an actuating instrument for operably controlling at least one work function by means of the utility vehicle.

11. The method of claim 1, wherein the locking element comprises a pushbutton on the control element, which unlocks the control element and automatically triggers the standstill driving state.

12. The system of claim 2, wherein the locking element comprises a pushbutton on the control element, which unlocks the control element and automatically triggers the standstill driving state.

* * * * *